United States Patent [19]
Doerfling

[11] 3,966,526
[45] June 29, 1976

[54] PROCESS FOR MAKING RESILIENT LAMINAR PANEL

[75] Inventor: Ralph G. Doerfling, Walled Lake, Mich.

[73] Assignee: Detroit Gasket & Manufacturing Company, Detroit, Mich.

[22] Filed: Dec. 9, 1974

[21] Appl. No.: 530,806

Related U.S. Application Data

[60] Division of Ser. No. 344,629, March 26, 1973, Pat. No. 3,867,240, which is a continuation-in-part of Ser. No. 255,524, May 22, 1972, abandoned.

[52] U.S. Cl. .............................. 156/224; 156/252; 156/267; 181/33 GA; 296/137 A
[51] Int. Cl.² .................... B65D 25/06; E04B 1/74
[58] Field of Search ........... 156/252, 253, 267, 305, 156/280, 224, 222; 296/137 A, 137 R; 181/33 GA, 33 G, DIG. 1; 428/131, 137, 138, 314

[56] References Cited
UNITED STATES PATENTS

| | | |
|---|---|---|
| 2,326,763 | 8/1943 | Crandell ........................ 181/33 GA |
| 2,355,454 | 8/1944 | Lucius ............................. 181/33 G |
| 2,412,713 | 12/1946 | Burt ................................ 181/33 G |
| 2,455,926 | 12/1948 | Gessler et al. .................... 181/33 G |
| 3,042,446 | 7/1962 | Stahl .............................. 181/33 GA |
| 3,286,784 | 11/1966 | Mariner .......................... 428/138 X |
| 3,300,357 | 1/1967 | Doerfling ............................ 156/224 |
| 3,361,610 | 1/1968 | Hannes ............................... 156/224 |
| 3,509,671 | 5/1970 | Akerson ......................... 181/33 GA |
| 3,621,934 | 11/1971 | Thrasher et al. ................ 181/33 GA |
| 3,673,030 | 6/1972 | Blanc De La Naulte et al. 156/267 X |

Primary Examiner—Douglas J. Drummond
Assistant Examiner—M. G. Wityshyn
Attorney, Agent, or Firm—Harness, Dickey & Pierce

[57] ABSTRACT

An improved decorative resilient laminar panel and the method of fabricating said panel which is characterized by its shape-retaining compound contour and selected embossments over predetermined areas thereof and which comprises a perforated thermoplastic resin foam disposed between a pair of perforated cover sheets which are coated with a moisture-resistant sealing material. The resilient laminar panel is particularly applicable for use as automobile interior trim panels in which the exposed face surfaces thereof are provided with decorative coatings or decorative plies to enhance the aesthetic and functional characteristics thereof.

12 Claims, 8 Drawing Figures

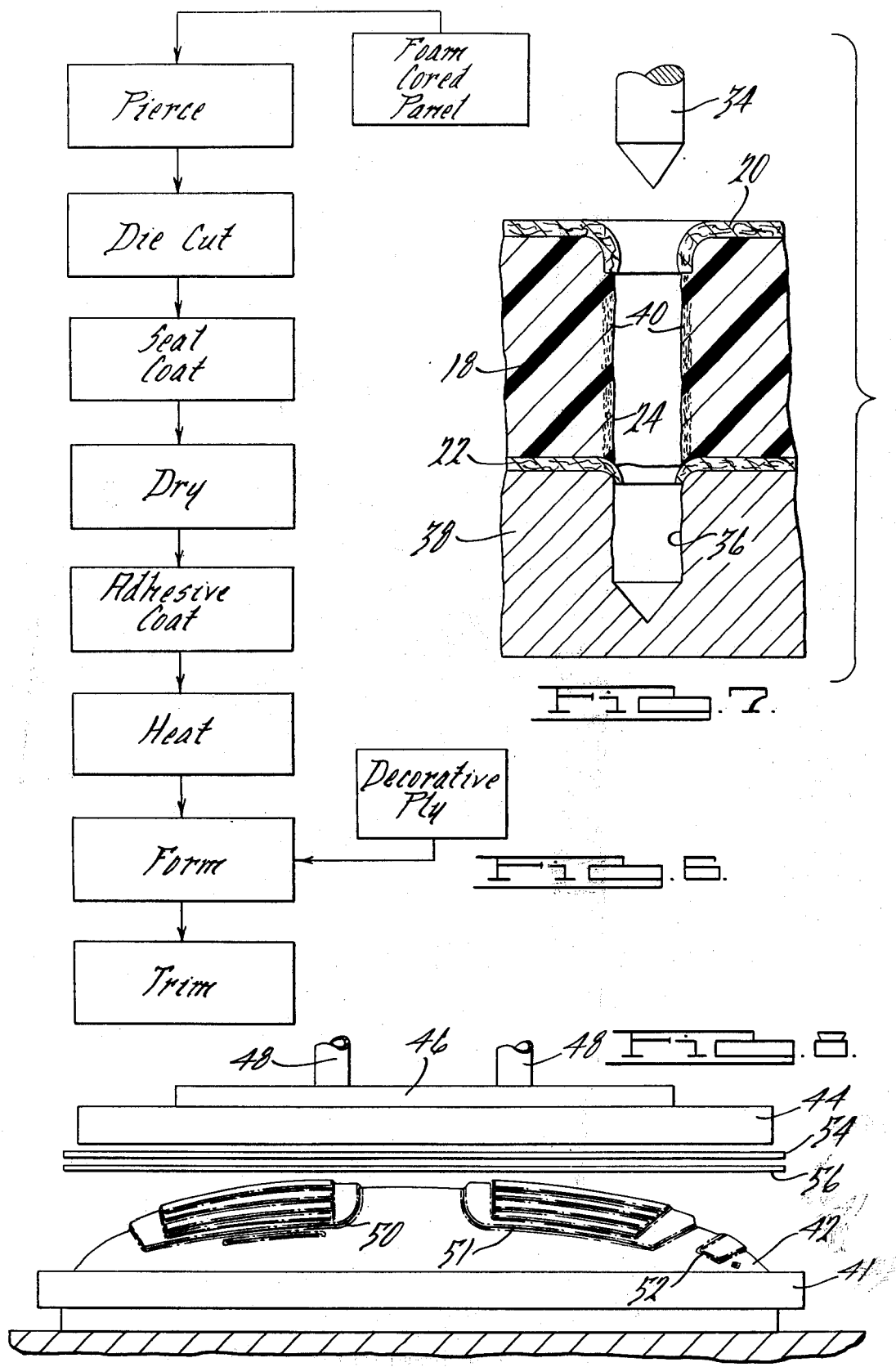

PROCESS FOR MAKING RESILIENT LAMINAR PANEL

CROSS-REFERENCE TO RELATED APPLICATION

This application is a division of prior copending application Ser. No. 344,629, filed Mar. 26, 1973, now U.S. Pat. No. 3,867,240, which comprises a continuation-in-part of prior copending application Ser. No. 255,524, filed May 22, 1972, now abandoned.

BACKGROUND OF THE INVENTION

The present invention is particularly applicable but not necessarily restricted to the fabrication of automobile interior trim panels of the type employed to enhance the appearance and comfort of the passenger compartment of automobile vehicles. Of the various trim panels employed, the headliner overlying the undersurface of the steel roof panel has constituted a continuing problem in automobile design and manufacture. Typically, interior roof trim panels or headliners employed in modern passenger cars and trucks are formed with a compound curvature corresponding to that of the steel roof panel and are provided with a decorative coating or ply over the exposed face surface thereof to enhance the aesthetic appearance of the interior of the vehicle. Such headliner panels in addition to their aesthetic function, also serve as an insulator against sound and heat transmission to the interior of the vehicle body and to some degree, also perform a safety function as a result of their impact absorption properties.

In an attempt to meet the myriad of requirements specified for headliners employed in modern automotive vehicles, a variety of materials and processing techniques have been used or proposed for use which concurrently provide for a low-cost structure which is of simple and versatile installation. None of the headliner constructions of the types heretofore known have been entirely satisfactory either because of their relatively high cost, difficulty of fabrication, problems associated with their installation, or lack of adequate flexibility and versatility of use. For example, the inaccessibility of the passenger compartment has in many instances necessitated the use of sectionalized headliner constructions which upon installation require the use of trim moldings to cover the abutting edges of adjoining headliner sections. Alternatively, cloth or plastic film headliners have been used which can be readily passed through a door or window opening during installation and which include a plurality of lifting wires or bows which extend transversely of the roof panel and are joined at longitudinally spaced intervals to the side edges of the automobile body. Such headliners, however, require a relatively large amount of labor to install and are costly for this and other reasons.

Integral one-piece panels which are sufficiently flexible to enable deformation thereof in order to transfer them to within the vehicle passenger compartment during installation have, in many instances, been unsatisfactory in view of the supplemental supporting structure required to maintain such headliners in appropriate pisition, as well as relatively high fabrication and installation costs of such trim panels.

The present invention overcomes the problems and disadvantages associated with interior trim panels and processes for making such panels of the types heretofore known by providing a simple, economical, durable, attractive and versatile laminar panel which is sufficiently resilient to sustain relatively drastic deformations during storage, handling and installation without fracture or damage thereto, and which moreover provides flexibility in the styling consistent with any particular interior styling theme.

SUMMARY OF THE INVENTION

The benefits and advantages of the present invention are achieved by a decorative trim panel which is of a resilient laminar construction and is formed with a preselected shape-retaining contour therein, which may further include embossments over selected areas thereof. The laminar panel is comprised of a thermoplastic substantially rigid resin foam core having a cover sheet overlying and bonded to each face surface thereof, and which panel is further provided with a plurality of perforations extending therethrough and distributed at spaced intervals over substantially the entire area of the panel. A film or coating of a moisture impervious sealing material extends over the exterior surfaces of the cover sheets, as well as the inner surfaces of the perforations through the panel. The exposed face surface of the contoured panel is provided with a suitable pervious decorative coating or film thereover to enhance the aesthetic appearance thereof.

In its process aspects, the present invention is directed to a method in which the thermoplastic resin foam-cored laminated sheet is preliminarily pierced so as to impart a plurality of perforations ttherethrough, whereafter the pierced and die-cut panel is sealed by applying a coating of a moisture-impervious film-forming substance thereover which thereafter is dried. The resultant sealed panel is heated to an elevated temperature for a period of time sufficient to effect a heat softening of the thermoplastic resin core, providing sufficient ductility to enable a deformation of the panel to a preselected contour, whereafter the panel is cooled to a temperature at which a sufficient rigidification of the foam core occurs to retain at least a portion of the contour imparted thereto.

In accordance with the preferred embodiments of the article and method aspects of the present invention, the piercing of the foam-cored panel is performed in a manner to avoid any appreciable removal of material therefrom and without any appreciable reduction in the thickness thereof, whereby the perforated or pierced core is characterized as having higher foam densities in the localized regions encircling the perforations therethrough in comparison to the regions spaced from the perforations and wherein at least a portion of one of the cover sheets extends into the perforations and overlies at least a portion of the interior surfaces thereof.

Additional benefits and advantages of the present invention will become apparent upon a reading of the description of the preferred embodiments taken in conjunction with the accompanying drawings.

BRIEF DESCRIPTION OF THE DRAWINGS

FIG. 6 is a schematic flow diagram illustrating the steps of the process for making the headliner panel shown in FIGS. 1–5;

FIG. 7 is a magnified fragmentary vertical sectional view through the headliner panel and a punch and die set illustrating a preferred manner of piercing the panel; and FIG. 8 is a fragmentary side elevational view, partly schematic, illustrating a die assembly for effecting a deformation of the foam-cored panel and a simultaneous attachment of a decorative ply to one face surface thereof.

DESCRIPTION OF THE PREFERRED EMBODIMENTS

Figure 1:
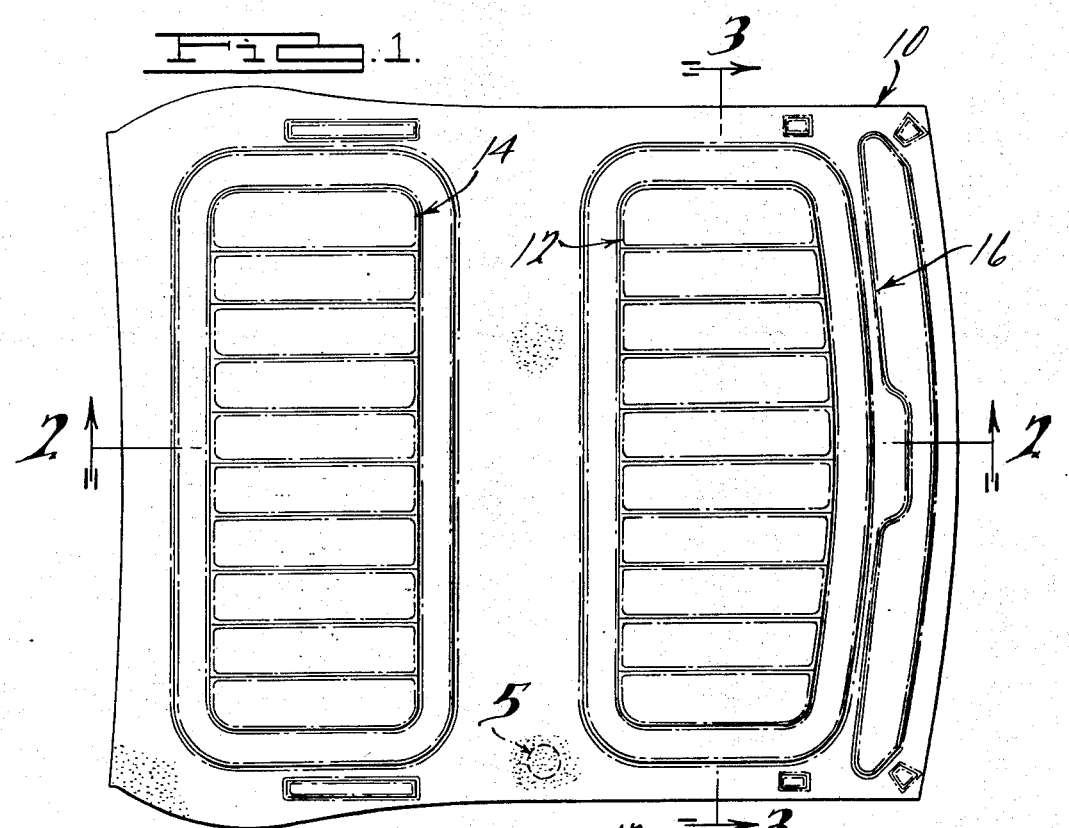
FIG. 1 is a plan view of a resilient laminar headliner panel made in accordance with the practice of the present invention.
Figure 2:
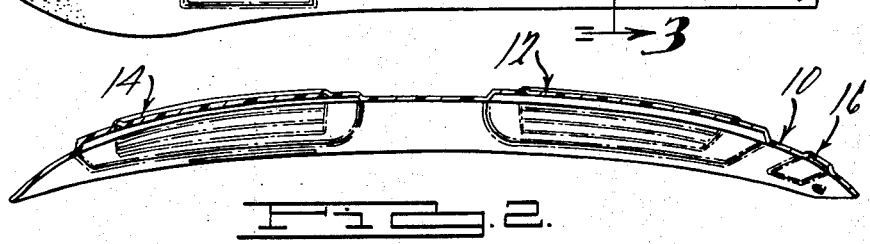
FIG. 2 is a longitudinal vertical sectional view through the headliner panel shown in FIG. 1 as viewed substantially along the line 2—2 thereof.
Figure 3:
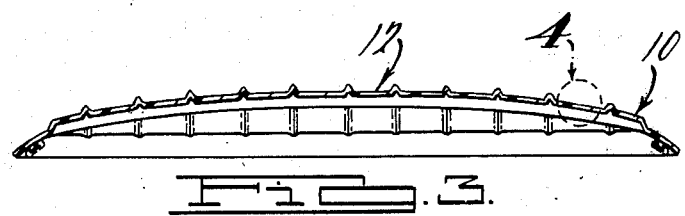
FIG. 3 is a transverse vertical sectional view through the headliner shown in FIG. 1 and taken substantially along the line 3—3 thereof.

Referring now in detail to the drawings, and as may be best seen in FIGS. 1–5, a resilient laminar trim panel made in accordance with the preferred practice of the present invention is typified by an automobile headliner 10 which is provided with a preselected compound contour therein. The headliner 10, as shown in FIGS. 1–3, is formed with a generally concave compound curvature with the convex surface thereof adapted to be disposed adjacent to the interior surface of the steel roof panel of an automobile and with the concave surface facing the interior of the passenger compartment. In the exemplary headliner shown, an enhancement of its decorative appearance is further provided by means of two generally rectangular and fluted embossments 12, 14, which are disposed so as to be located generally above the front and rear passenger seats, respectively. In addition, the front or right edge of the headliner 10, as viewed in FIG. 1, is formed with an embossment 16 for receiving the sun visors when folded upwardly to a stored position. It will be appreciated from the foregoing that any one of a variety of simple and compound curvatures, as well as decorative embossments, can be incorporated at selected locations over the area of the headliner or other trim panels in order to achieve optimum styling and performance characteristics in accordance with the practice of the present invention.

Figure 4:
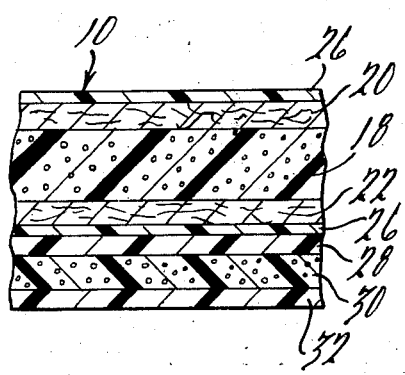
FIG. 4 is a magnified fragmentary sectional view of the laminar structure of the headliner shown in FIG. 3 and taken in the area encompassed by the dotted circle indicated at 4.

The headliner 10, as best seen in FIG. 4, is comprised of a substantially thermoplastic resin foam core 18 which is of a substantially uniform thickness throughout and which is disposed between a pair of cover sheets 20, 22, which are adhesively bonded or otherwise secured thereto. The cover sheets 20, 22 and the foam core 18 are provided with a plurality of apertures or perforations indicated at 24 in FIG. 5. The exposed surfaces of the cover sheets 20, 22 and the edges of the foam core 18, as well as the surfaces of the perforations 24 through the composite laminar panel, are coated with a moisture-resistant seal coating 26 which is of a material compatible with the cover sheets and the resin foam core.

A decorative pervious surface coating or finish is applied to one or both faces of the laminar panel and is secured such as by an adhesive layer 28, as shown in FIG. 4, which overlies the lower surface of the seal coating 26 over the cover sheet 22. The composite foam-backed cover sheet in the specific embodiment illustrated comprises a resilient foam layer 30 and a plastic exterior film 32 tenaciously bonded thereto.

The foam core 18 may comprise any suitable lightweight substantially rigid thermoplastic or partly thermoplastic resin foam which will soften when heated to moderate elevated temperatures, enabling a formation of the panel and an embossment thereof to a desired final contour. Of the various thermoplastic foams that can be satisfactorily employed, polystyrene foam of a density broadly ranging from about 2 up to about 10 pounds per cubic foot, preferably from about 3 to about 6 pounds per cubic foot, and typically about 4 pounds per cubic foot, has been found particularly satisfactory. The foam core for most interior vehicle trim panels may range in thickness from about ⅛ inch up to about ¼ inch and usually is of substantially uniform thickness throughout. Thicknesses less than about ⅛ inch have been found not to provide adequate strength and physical properties, particularly in the case of relatively large trim panels; whereas thicknesses in excess of about ¼ inch are more costly and more difficult to form and do not provide any appreciable advantages over foam cores of ¼ inch or less.

The cover sheets 20, 22 serve to support and protect the relatively fragile face surfaces of the foam core 18 disposed therebetween and further contribute to the strength and resiliency of the resultant contoured panel. Of various materials suitable for use as cover sheets, cellulose base cover sheets, and particularly kraft paper sheets, have been found satisfactory in view of their high strength and relatively low cost. Typically, when kraft paper is employed as the cover sheets 20, 22, papers may be employed of thicknesses ranging as low as about 0.008 up to about 0.020 inch and weights of from about 30 to about 50 pounds per ream. While kraft papers of a lesser thickness and weight per ream than the lower values hereinbefore specified can be employed in some instances, their strength and puncture resistance is low, requiring increased precautions in the handling of trim panels incorporating such paper cover sheets. On the other hand, while kraft paper cover sheets of a weight greater than 50 pounds and of a thickness greater than about 0.020 inch can be satisfactorily employed, they are more expensive and do not provide any appreciable advantages over thinner kraft paper materials, whereby their use is generally not economically justified.

The cover sheets are bonded or otherwise adhesively secured to the opposed face surfaces of the foam core over substantially the entire inner faces therebetween. This can be achieved by employing a suitable adhesive compatible to the cover sheets and underlying foam core or, alternatively, the cover sheets can be bonded to the foam core by an in situ foaming of the resin between the two cover sheets disposed in spaced substantially parallel relationship. Processes are in commercial use for fabricating foam-cored panels in which a polystyrene resin reaction mixture is disposed between two kraft paper cover sheets disposed between spaced platens whereby the reaction mixture is foamed in situ and adheres the cover sheets into an integral laminated cored structure.

Such foam-cored and laminated structures have heretofore been used or proposed for use as interior trim panels but the fragile nature thereof has necessitated a deep surface scoring to permit a bending of the panels at selected locations to provide the desired curvature. The susceptibility of such foam-cored panels to damage during storage, handling and installation, as well as the difficulty of effecting a replacement of such panels because of their inflexibility, has detracted from a commercial widespread use thereof. The perforating and post treatment of such foam-cored panels in accordance with the practice of the present invention overcomes the aforementioned problems.

Figure 5:
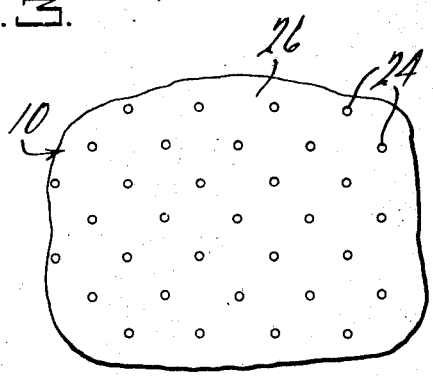
FIG. 5 is a magnified fragmentary plan view of a portion of the face surface of the headliner shown in FIG. 1 encompassed by the dotted circle indicated at 5 thereof.

The panel comprising the foamed core and overlying cover sheets is preliminarily die-cut to a desired shape and size and thereafter is subjected to a piercing operation in accordance with the process schematically illustrated in FIG. 6, wherein a plurality of the perforations 24, as shown in FIG. 5, are imparted thereto. The perforations 24 impart porosity to the laminated panel, enabling air flow therethrough to accommodate sudden changes in pressure at opposite sides of the panel, such as the rapid opening or closing of a door of a passenger vehicle. Additionally, the porosity enables circulation of air to enhance the heating and cooling characteristics of the passenger compartment and also serves to increase the sound insulating properties of the trim panel. In addition to the foregoing, the provision of the perforations also imparts some resiliency to the otherwise substantially rigid unperforated panel, facilitating the subsequent forming and embossing thereof, as well as the resultant resiliency of the completed panel.

The piercing or perforating operation is carried out to impart a plurality of perforations in the overlying cover sheets which extend through the foam core therebetween. Preferably, the perforations are distributed at uniform intervals over substantially the entire area of the panel. Typically, the perforations are arranged in a square or a triangular pattern, as typified by FIG. 5, and are disposed at a frequency or concentration of about 10 to about 50 perforations per square inch or, alternatively, at a frequency of about 4 to about 6 per lineal inch of panel. The perforations themselves may be of any particular cross sectional configuration, although circular perforations are most satisfactory and may range in average diameter of from about 1/32 up to about 3/32 inch.

In accordance with a preferred practice of the present invention, the piercing of the laminated foam core panel is accomplished in a manner so that no significant material is removed from the panel and whereby no appreciable reduction in thickness of the panel occurs in spite of the pressures exerted on the relatively low density fragile foam by the piercing tool. This can be achieved, such as shown in FIG. 7, by employing a tapered piercing tool 34 having a pointed end which is adapted to pass through the cover sheets 20 and 22 and the foam core 18 therebetween and become disposed within a correspondingly shaped die cavity 36 of the die button 38. As will be noted in FIG. 7, the use of a sharp pointed piercing tool 34 effects a lateral displacement and local densification of the foam in a region immediately adjacent to the wall of the perforation 24, as indicated at 40 by the shading, in comparison to the density of the foam at locations spaced therefrom. This localized densification of the foam contributes to the physical characteristics and resiliency of the resultant foamed panel and also serves to conserve material since no slug or waste is generated during the piercing operation.

It will be further observed from FIG. 7 that the use of the tapered piercing tool 34 also serves to deflect and roll the upper cover sheet 20 downwardly and in overlying relationship around the upper portion of the foam core exposed in the perforation, which also serves to strengthen the resultant pierced assembly.

At the completion of the piercing operation, which may most conveniently be performed incrementally across the surface of the panel by a tool having a plurality of the piercing tools 34 thereon, the pierced panel is die-cut if not previously cut, whereafter the exterior surfaces thereof, including the surfaces of the perforations therethrough, are sealed.

In accordance with a preferred practice of the present invention, the pierced panel, prior to sealing, is subjected to a post-expansion and subsequent sizing step in order to remove any surface irregularities and undulations which may have occurred during the piercing operation. The post-expansion and sizing step has been found particularly desirable when processing panels having a foam core consisting of polystyrene and other cellular plastic cores of similar physical characteristics which undergo some crushing during the piercing operation, resulting in a measurable reduction in its thickness. The magnitude of crushing of the panel will vary depending upon the specific cellular plastic employed, the thickness and density of the cellular core and its resistance to being pierced, the thickness and physical properties of the cover sheets, the size, shape and frequency of distribution of the perforations, as well as the specific manner and equipment by which the perforating operation is performed.

Typically, panels comprised of polystyrene foam having a density of about 4 pounds per cubic foot which are of a thickness of from about ⅛ to about 3/16 inch and are disposed between two kraft paper cover sheets, each of a thickness of 0.013 inch, will undergo a reduction in thickness of about 10 percent to about 40 percent upon being perforated to incorporate perforations of about 1/16 inch diameter disposed at a frequency of 5 per linear inch. For example, foam-core panels of the foregoing type of an original thickness ranging from about 0.130 inch to about 0.150 inch will be reduced to a nominal pierce thickness of about 0.075 to about 0.125 inch. Upon post-expansion of the pierced panel, it will regain its original thickness, and preferably a thickness slightly exceeding its original thickness such as from about 0.130 inch to about 0.200 inch, whereafter the resultant sizing operation restores the panel to its original nominal thickness.

The post-expansion step is carried out at an elevated temperature sufficiently high such that the initial blowing agent in the cellular foam core effects a further expansion thereof to its original thickness or a thickness slightly greater. In the case of polystyrene foam cores, the residual blowing agent entrapped within the plastic beads defining the noninterconnected cell structure of the core is effective upon being subjected to temperatures from about 150°F up to about 300°F, and preferably from about 225°F to about 275°F, to effect a rapid expansion of the pierced core. While hot air can be employed for this purpose, good penetration of the pierced panel is achieved by employing steam under pressure while the panel is disposed within a steam chest. A heating of such pierced panels employing 40 psig steam at about 268°F for a period of 5 to 20 seconds has been found to restore such pierced panels to their original thickness. During the post-expansion step, the heating and supplemental blowing of the foam core is carried out in a manner so as not to close the perforations, although some reduction in diameter is usually encountered. Generally the densification of the foam core in the area immediately surrounding each perforation is accompanied in part by a rupture of the individual resin beads such that only a minimal blowing in a lateral direction tending to close the pores occurs in that vicinity.

It has also been observed that the piercing operation, depending on the specific technique employed, imparts undesirable surface irregularities or undulations to the panel which are not completely removed during the post-expansion and subsequent molding operation. The presence of such surface undulations has been found to present problems during the application of a liquid sealer such as by roll coating techniques due to a tendency of the liquid sealer to puddle in depressed areas of the panel. In view of the foregoing, the post-expanded panel is resized and surfaced so as to provide planar smooth surfaces and a panel which is of a constant thickness.

The sizing step is achieved by subjecting the opposite faces of the panel to a high nonpenetrating heat so as to effect a heat softening of the stratum of the foam core disposed immediately beneath the facing sheets, whereupon the application of pressure through a flat platen or roll effects the compaction of any crests or peaks on the panel surface, providing a smooth planar surface. The heating and compaction of the panel during the sizing step can be achieved by incremental advancement of the panel between a pair of heated platens or, alternatively, by passage between a pair of heated rolls. The particular temperature at which the sizing operation is performed will vary depending upon the composition of the cover sheets, the thermoplastic characteristics of the cellular core and the magnitude of size reduction required in order to remove surface irregularities from the panel. For panels having kraft paper facing sheets disposed in overlying relationship relative to a polystyrene foam core, time-temperature relationships of about 200°F at three seconds up to about 300°F for one second, and preferably about 250°F for two seconds, have been found satisfactory. In any event, the sizing operation is carried out in a manner to avoid closure of the perforations previously imparted to the panel during the piercing operation.

It is also contemplated that the post-expansion and sizing of the pierced panel can be performed during the final heating and forming operation. The latter approach is less desirable, however, since the presence of the seal coating, the adhesive coating and any decorative facing sheet prevents satisfactory penetration of heat to the interior of the foam core to effect optimum expansion thereof in many instances. The presence of the foregoing coatings and facing sheets also prevents, in some instances, the use of temperatures necessary to effect a heat softening of the cellular core in order to avoid thermal degradation of such materials. It has also been found that in many instances the surface irregularities imparted to the panel during the piercing operation are not satisfactorily removed during the forming of the panel, and it is for these and other reasons that the post-expansion and sizing operations are preferably performed immediately after the piercing step as previously described.

The sealing step, as diagrammatically illustrated in FIG. 6, may conveniently be accomplished by applying a liquid coating composition to the pierced panel surfaces such as by flooding, brushing, rolling, immersion, spraying and the like, whereafter the excess liquid coating composition is removed by suitable wipers and by blowing the excessive amounts from the interior of the perforations, leaving a residual seal coating 26 thereover. The seal coating thereafter is suitably dried, preferably by heating to a moderate temperature in an air circulating oven or tunnel, as diagrammatically indicated in FIG. 6.

Any one of a variety of suitable materials can be used for forming the moisture impervious seal coating 26 which are selected from those that are compatible with the cover sheet and resin foam core, as well as the adhesive layer 28 used for affixing the decorative ply or coating to one or both faces of the resultant contoured panel. In addition to preventing penetration of moisture and other extraneous solvents into the cover sheets and the underlying foam resin core, the seal coat 26 also tends to impart formability to the cover sheet, contributes to the strength of the panel after deformation to the desired contour and also serves as a barrier layer to resist penetration of the adhesive coating, such as the adhesive layer 28 as shown in FIG. 4. Of the variety of materials that have been found suitable for forming a sealing coat, particularly satisfactory results have been obtained utilizing clear lacquer sealers in volatile solvents, of which a coating designated as number 9496, commercially available from Mobile Chemical Company, has been found particularly satisfactory.

After the application and subsequent drying of the seal coating, the adhesive layer 28 is applied to one exposed face of the cover sheet, whereafter the sealed and adhesively coated panel is heated to an elevated temperature to effect a heat softening thereof, enabling subsequent deformation. Alternatively, the adhesive coating can be applied to one or both faces of the heated panel upon emergence from a heating oven or can be applied to the decorative ply prior to its disposition in overlying relationship relative to the perforated panel. For this purpose, any compatible adhesive of the various types well known in the art can be satisfactorily employed, of which adhesives in the form of aqueous emulsions including emulsified binders such as acrylic base adhesives are particularly satisfactory. In those instances in which the adhesive layer is applied to the perforated panel prior to heating thereof, the adhesive material is selected so as to remain tacky and active during the heating cycle up until such time that the decorative ply is united therewith.

During the heating step, the laminated foam core panel is heated to an elevated temperature for a period of time sufficient to effect a heat softening thereof, thereby rendering it sufficiently ductile to deform and emboss as may be desired without encountering any cracking or rupture of the foam core structure and overlying cover sheets. The particular temperature and duration of time will vary depending on such factors as the particular composition of which the resin foam core is comprised, the thickness of the foam core, the density of the foam core, the frequency and size of the perforations through the panel, the type and thickness of the cover sheets overlying the foam core, the thickness and type of seal coating on the panel and whether or not an adhesive layer has been applied to one or both exterior faces of the composite panel. Generally, optimum time-temperature relationships can be selected consistent with the foregoing considerations and in the case of laminar panels employing a 42-pound kraft paper of a thickness of 0.013 inch as the cover sheet, a ⅛ inch polystyrene foam core of a density of about 4 cubic feet per pound and thermoplastic lacquer sealer corresponding to Type 9496 from Mobile Chemical Company with an aqueous emulsion-type acrylic adhesive on one face surface thereof, heating cycles at about 250°F in a hot air recirculating oven for periods of about 30 seconds have been found satisfactory for effecting a sufficient heat softening of perforated panels of a size generally ranging from about 4 feet to about 5 feet in size. Generally, the temperature can be varied from as low as about 150°F up to about 300°F or below that at which a deterioration of one or more of the components of the composite panel occurs with a corresponding adjustment in time to effect an optimum heat softening of the panel.

At the conclusion of the heating cycle, the resultant heat softened panel is transferred to a forming operation which may conveniently employ a die set as schematically illustrated in FIG. 8. As shown, a contouring die set is mounted in a suitable press comprising a base 41, to the upper surface of which a contoured male mold 42 is mounted and is disposed in vertical alignment with a female mold 44 affixed to the underside of a movable press platen 46 vertically reciprocable by means of slides 48. In addition to the compound curvature of the male and female molds 42, 44, suitable patterns such as indicated at 50, 51 and 52 can be provided on the mold surfaces to impart a preselected embossment on the panel during the forming operation, such as the embossments 12, 14 and 16 indicated in the headliner shown in FIG. 1.

In accordance with the press arrangement shown in FIG. 8, the heat softened, perforated and sealed composite laminar panel indicated at 54 is disposed in overlying relationship relative to a decorative ply 56 with a suitable adhesive coating therebetween, whereafter the female mold 44 is lowered, effecting a concurrent deformation, embossment and bonding of the decorative ply to the laminar panel. The deformed assembly is retained within the closed mold for a period of time sufficient to provide for a cooling of the thermoplastic resin core and a rigidification thereof sufficient to effect a retention of at least a portion of the contour and embossment therein upon a reopening of the press. Usually press cycle times of about 20 seconds are satisfactory for this purpose. In order to prevent a too rapid or premature cooling of the heat softened panel 54, the mold surface in contact therewith is preferably warm, such as at a temperature of about 100°F to about 200°F. After the composite panel has cooled and the adhesive set, the press is opened and the resultant headliner panel removed and subjected to final trimming as schematically illustrated in FIG. 6.

It will be appreciated that the decorative surface coating or ply secured to one or both face surfaces of the laminated foam-cored panel may comprise a coating applied in the form of a liquid spray or the like, as well as various films, fabrics or other pervious materials, including paper and woven and nonwoven cloth, to achieve the desired aesthetic appearance. In the specific embodiment shown in FIG. 4, the decorative ply is of a composite structure consisting of a relatively thin resilient polyurethane foam layer 30, which is securely bonded to a perforated and grained polyvinyl chloride facing sheet 32, providing therebetween an attractive appearance which is also pleasing to the touch. The term "ply" accordingly is used in the description and subjoined claims in its broad sense to include decorative coatings of any one of the foregoing or combinations of the foregoing types. In some instances, the decorative ply can be secured to the laminated foam core panel at an appropriate step prior to the heating step and the composite integral panel subsequently formed in a manner as previously described.

Composite laminar trim panels including automobile headliners prepared in accordance with the process as hereinbefore described have been found to be of excellent resiliency and strength, enabling relatively rough handling during shipment, storage and installation without incurring any visible damage thereto. Panels employing a substantially rigid thermoplastic foam, such as polystyrofoam, upon assembly into a vehicle headliner, for example, can be rolled and handled in a manner to enable the folding of relatively large headliners into compact shapes, enabling passage thereof through the window or door openings of vehicles during the assembly operation. The flexibility and resistance to damage of such panels is particularly desirable in facilitating "in field" replacement of headliners which have become damaged during use of the vehicle. The resistance to damage of such headliners during handling and installation has also materially reduced the amount of scrap in vehicle manufacturing operations.

While it will be apparent that the description of the preferred embodiments are well calculated to achieve the advantages and benefits of the present invention, it will be appreciated that the invention is susceptible to modification, variation and change without departing from the spirit thereof.

What is claimed is:

1. A method for making a resilient laminar panel of a preselected shape-retaining contour which comprises the steps of forming a layer of substantially thermoplastic rigid foam having cover sheets bonded to the face surfaces thereof providing therewith an integral laminar foam-cored panel, piercing said foam-cored panel to impart a plurality of perforations extending therethrough from one face to the opposite face of said panel and performed in a manner to deform and laterally displace and locally densify said foam in a region surrounding each perforation without incurring any appreciable removal of material and without significantly reducing the thickness of said panel, said piercing step performed to distribute said perforations at spaced intervals over substantially the entire surface area of said panel, coating the exterior surfaces of said panel including the interior surfaces defining said perforations with a sealing material forming a substantially moisture-resistant barrier thereover, heating the sealed said panel to an elevated temperature for a period of time sufficient to effect a softening thereof, deforming the heat softened said panel to impart a preselected contour thereto, cooling the deformed said panel to a temperature at which a rigidification thereof occurs of a magnitude sufficient to retain at least a portion of the preselected contour therein, and applying and securing a pervious decorative ply to one said face surface of said panel forming a decorative laminar panel.

2. The method as defined in claim 1, including the further step of die-cutting said panel to a preselected configuration prior to deformation thereof.

3. The method as defined in claim 1, including the further step of trimming the periphery of said decorative laminar panel to a preselected shape and size.

4. The method as defined in claim 1, wherein said thermoplastic rigid foam comprises a polystyrene foam and the heating step is performed in a manner to heat said panel to a temperature ranging from about 150°F to about 300°F.

5. The method as defined in claim 1, wherein the piercing step is performed utilizing a pointed tapered piercing tool effecting a lateral displacement and local densification of said foam in a region surrounding each perforation and wherein one said cover sheet is turned inwardly in overlying encircling relationship over the inner surface of the perforations.

6. The method as defined in claim 1, wherein the piercing step is performed to produce a substantially uniform distribution of the perforations over the entire surface area of said panel at a frequency of about 10 to about 50 perforations per square inch.

7. The method as defined in claim 1, wherein the piercing step is performed to arrange the perforations in a triangular repetitive pattern and at a frequency of about 4 to about 6 per lineal inch.

8. The method as defined in claim 1, wherein the piercing step is performed to produce perforations of an average diameter of about 1/32 to about 3/32 inch.

9. The method as defined in claim 1, including the further step of heating the pierced said foam-cored panel after the piercing step and prior to the coating step to an elevated temperature for a period of time sufficient to effect an expansion of said panel to a thickness corresponding to at least about its original thickness prior to the piercing operation.

10. The method as defined in claim 1, including the further step of sizing the pierced said foam-cored panel after the piercing step and prior to the coating step by heating the thermoplastic rigid foam to an elevated temperature to effect a heat softening thereof in the stratum immediately adjacent to the cover sheets and thereafter compressing the heat softened said stratum in a manner to form substantially flat smooth face surfaces.

11. The method as defined in claim 9, wherein said post-expansion step is performed in a manner so as not to close the perforations imparted to said foam-cored panel during the piercing step.

12. The method as defined in claim 10, in which said sizing step is performed in a manner so as not to close the perforations imparted to said foam-cored panel during the piercing step.

* * * * *